J. G. JONES.
FILM FORMING MACHINE.
APPLICATION FILED APR. 5, 1921.
1,437,808.
Patented Dec. 5, 1922.
2 SHEETS—SHEET 1.
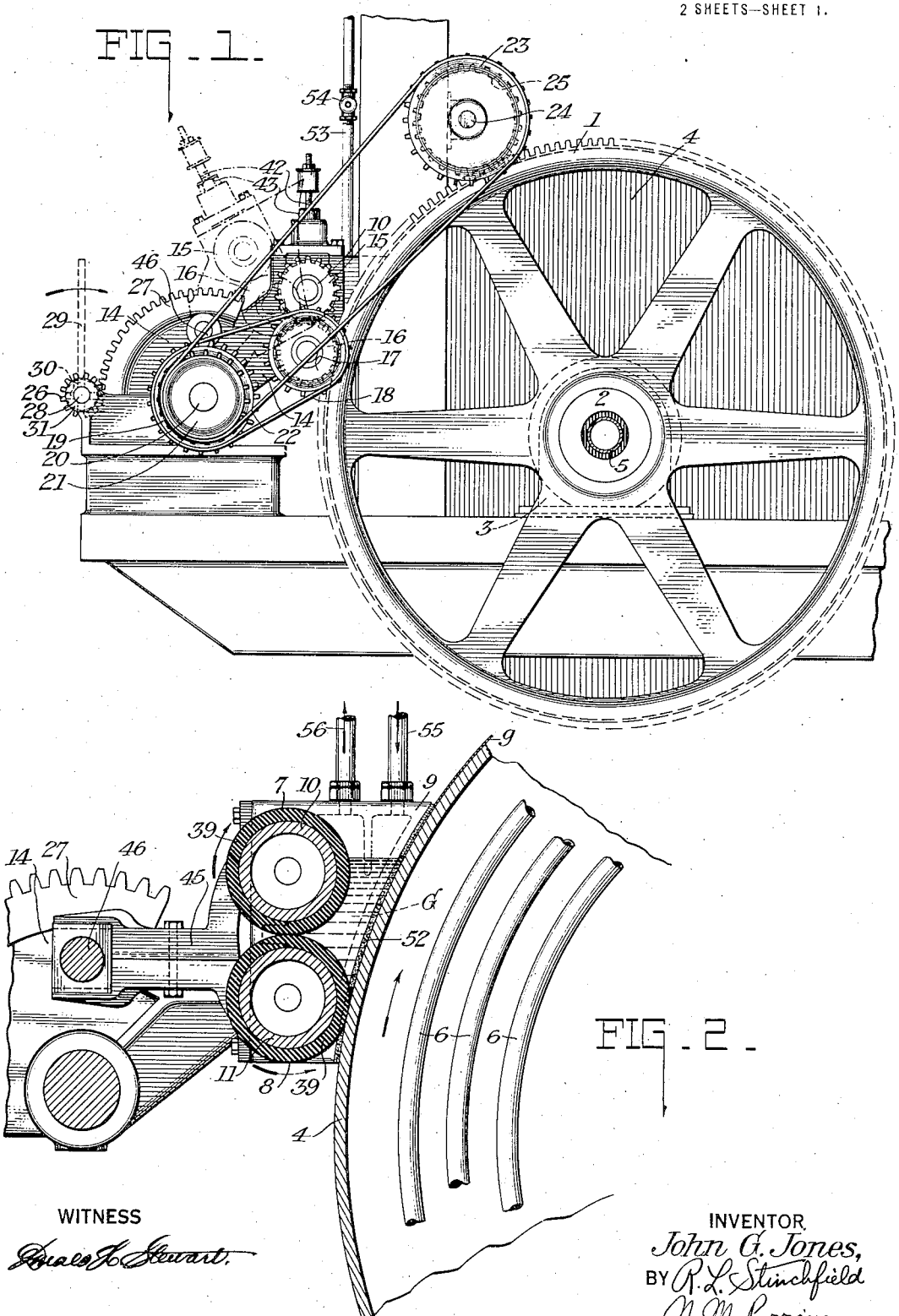
WITNESS
INVENTOR
John G. Jones,
BY
ATTORNEYS.

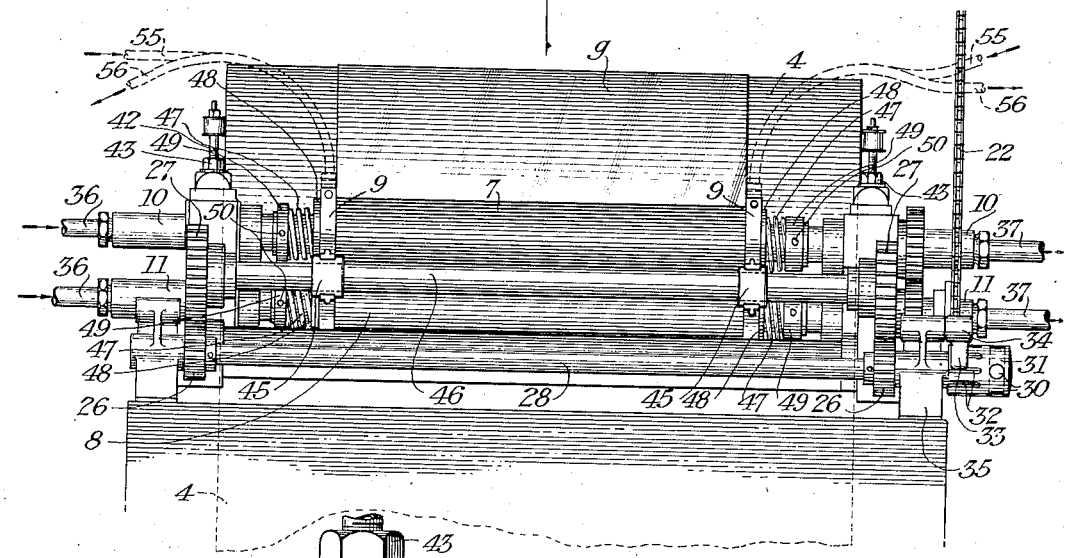
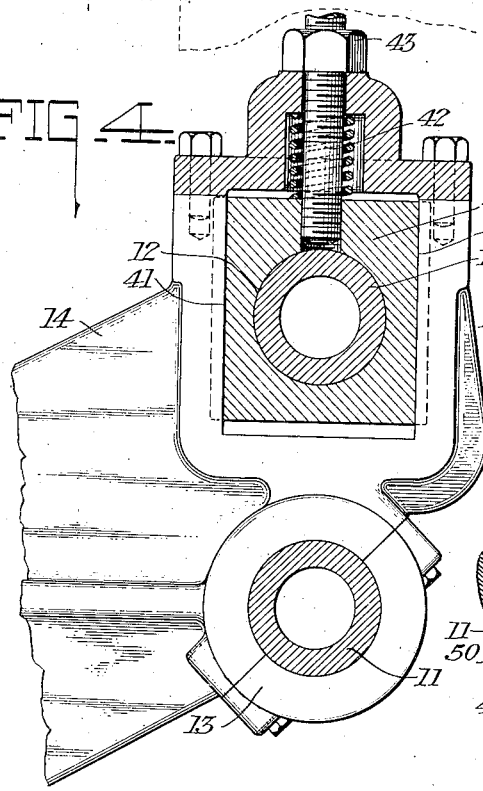
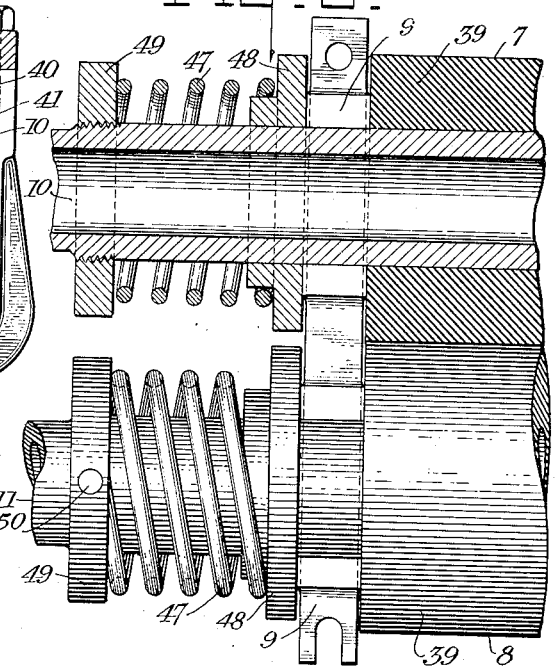

Patented Dec. 5, 1922.

1,437,808

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

FILM-FORMING MACHINE.

Application filed April 5, 1921. Serial No. 458,755.

*To all whom it may concern:*

Be it known that I, JOHN G. JONES, citizen of the United States of America, residing at Rochester, in the county of Monroe and State of New York, have invented certain new and useful Improvements in Film-Forming Machines, of which the following is a full, clear, and exact specification.

This invention relates to film forming apparatus and more particularly to apparatus for spreading a layer of heated liquid gelatinous material upon a chilled surface where it will harden sufficiently to form a coherent film-like sheet which can be handled and dried.

This apparatus is of the type in which the surface of a chill-drum is moved through a pool of heated liquid gelatine, causing a portion of the gelatine to adhere to it. The objects of my invention are to improve such mechanism so that the liquid material may be maintained at a uniform temperature throughout, and particularly at the ends of the pool where it has the greatest tendency to cool, so that a layer of even thickness and viscosity will be formed on the drum; and further to form the pool by the use of rollers between which and the drum the pool will be held, the construction being such that the parts are all readily accessible, comparatively simple in design, and permit of ready adjustment; and further to avoid the use of any part that will scrape the polished surface of the chill-drum, thus prolonging its useful life.

These and other objects will appear in the following description. Reference will now be made to the accompanying drawings, in which the same reference characters refer to the same parts throughout:

Fig. 1 is a side elevation of the principal parts of a machine constructed in accordance with and illustrating one form of my invention;

Fig. 2 is a section through a portion of the same machine;

Fig. 3 is an end elevation of the machine shown in Fig. 1, omitting the driving mechanism;

Fig. 4 is a fragmentary view, partly in section, of the bearings for the rollers, and Fig. 5 is a view, half in elevation and half in section, of one end of the rollers and dam.

This machine forms a sheet of gelatine by maintaining a pool of warm gelatine between rollers and a chilled drum, the surface of the drum carrying off a layer of gelatine. In the drawings a large gear wheel 1 is driven by a suitable source of power, being affixed to a hollow shaft 2, which turns in bearings 3 (only one of which is shown). A drum 4 is affixed to this shaft so as to revolve with the gear wheel. A pipe 5 passes through the hollow shaft 2 and communicates with a series of coils 6, Fig. 2, through which circulates brine or other cooling medium so that the interior of the drum and its surface may be kept at any desired temperature. A similar outlet pipe is provided at the bearing at the other end of the drum (not shown). Rollers 7 and 8 are of the same size, the latter roller being in contact with drum 4, and also contacting with the first roller 7. A pool of gelatine G is held as shown in Fig. 2 between the rollers and drum by means of plates 9 which form dams at the ends of the rollers. As the drum and rollers move with the same surface speed, in the direction indicated by arrows in Fig. 2, there is no scraping action, but the pressure between these parts causes the upper roller 7 to act as a squeegee for the lower, 8, preventing any gelatine from being carried around by roller 8, and introduced from below between the surfaces of the rollers and the drum. Thus the polished surface of the drum is not marred.

In order to rotate rollers 7 and 8 they are mounted upon hollow shafts 10 and 11 carried by bearings 12 and 13 in castings 14. Gear 15 of shaft 10 meshes with gear 16 of shaft 11, the latter being rotated by a sprocket 17 driven by a chain 18 which passes over a sprocket 19. A stub shaft 20 carries both this sprocket wheel 19 and another 21, the latter being driven by a chain 22 passing around wheel 23 fastened to shaft 24, which is driven by a gear 25 which meshes with the large gear 1.

When it is necessary to clean drum 4, rolls 7 and 8 with their associated mechanism can be moved from the drum by means of pinions 26 meshing with the gear segments 27 affixed to castings 14, one being provided at each end, as shown in Fig. 3. Pinions 26 are keyed to a shaft 28 operated by a rod 29 (Fig. 1) insertable into apertures 30 of a block 31, which is grooved at 32 so as to serve also as a ratchet in which a pawl 33 may drop, to hold the parts at the desired elevation. Pawl 33 is pivoted at 34 to the frame 35.

The rollers may be heated to keep the pool of gelatine flowable, though this is not essential. To this end they are mounted on hollow shafts 10 and 11, through which a heated fluid, such as hot water or steam, may be introduced by pipes 36, there being outlet pipes 37 at the opposite ends. The surface 39 of the rollers is preferably of rubber, as this forms a resilient surface which maintains close contact between roller 8 and the polished metal drum 4 without injury to the surface of the latter; and likewise the close contact between rollers 7 and 8 forms a liquid tight wall and squeegee. To adjust the tension between rollers 7 and 8, I make bearings 12 movable by providing bearing blocks 40 slidable in ways 41 in castings 14. A bolt 42 adjusted by nut 43 adjusts shaft 10 to and from shaft 11. Ordinarily only very slight adjustment is necessary, and such small movement does not affect the meshing of gears 15 and 16 which may be of comparatively loose fit, as the drive is always in one direction. However, should more than the usual adjustments be necessary, substitute gears may be used, it being necessary then to adjust the reducing and driving sprockets so that the surface speed of the rollers will be the same as that of the drum.

End plates or dams 9 close the ends of the pool or trough and prevent the gelatine G from flowing out from the ends of the pool. These dams are carried by yokes 45 which slide along shaft 46, as best shown in Fig. 2. To keep them tight against the roller ends (Fig. 5) springs 47 press against collars 48 which in turn exert thrusts against dams 9 longitudinal of shafts 10 and 11 toward rollers 7 and 8. Collars 49 are threaded to these shafts and keyed in the desired position by pins 50. In Fig. 5 I have shown one roller in elevation and the other in section, the yoke 45 having been removed.

The inner edge of the dams 9, or that edge which rests against drum 4, is faced with soft, non-abrasive contacting strips 52, so that the polished drum is not injured thereby. I find a heavy felt most suitable, although rubber is also satisfactory. As a film is not formed on the drum at these points, the scraping action does no harm.

The gelatine pool must be of substantially the same temperature throughout, the gelatine being fed into the pool at a constant temperature through pipe 53, the rate of flow being regulated by hand valve 54. The rollers are heated as hereinbefore described, and the dams 9 are also heated, so that only the gelatine lying next to drum 4 will be chilled, and this in an even layer. Dams 9 are hollow, see Fig. 2, as shown in dashed lines, so that a temperature controlling fluid such as hot water or steam can be introduced through pipe 55 and can pass out through pipe 56.

While the operation of the machine is clear from the above description, it will be briefly recapitulated. Liquid gelatine from a suitable tank or other source (not shown) is supplied at a constant elevated temperature through the supply pipe 53, the flow being controlled by any regulating means such as valve 54, so as to maintain the level of the pool reasonably constant. A trough is formed between the rollers and the chill-drum, and the dams are of such length that the top of the pool of gelatine can rise to the top of the upper roller, but as long as there is any gelatine left between the lower roller and the drum the machine operates satisfactorily. Considerable variation in the depth of the pool does not seem to affect materially the amount of film formed. The effective trough is that formed between the lower roll and the drum. The surface of the slowly revolving chill-drum 4 moves upward, carrying with it a thin layer of gelatine. I do not find it necessary to use any mechanical means to regulate the thickness of this layer, as under reasonably constant conditions the amount adhering is of a sufficiently constant thickness. The gelatine supply is maintained at such a temperature that the pool of gelatine will be kept in a sufficiently fluid condition, despite the chilling influence of the drum; and normally it is not necessary to heat the rolls 7 and 8. But the ends of the pool would be chilled more than is desirable without additional heat and I find the heated dams to be highly desirable in maintaining the heat at the ends of the pool, and thus insuring the spreading of the layer of gelatine evenly throughout its width. The upward movement of the resilient surface of roll 8 at the same rate as surface 4 does not subject the surface of the drum to a scraping action, and since the gelatine is sufficiently cooled by the time it has been carried partially around the drum to be drawn therefrom in a self-supporting sheet, without the use of a scraper that contacts the drum, the serviceable life of the polished surface of the drum is long. The squeegee roll 7 presses so tightly against the roll 8 that no gelatine is carried around by roll 8 and rubbed between it and the surface of drum 4. While the surfaces of rolls 7 and 8 are preferably of rubber, other materials may be used, and roll 7 in particular may be of a more rigid and durable material, reliance being placed on the resilience of roller 8 for intimate contact between the rollers. All of these parts are readily accessible for repair, adjustment or cleaning as has been pointed out.

While I have mentioned gelatine particularly, and while I have found the apparatus useful in the treatment of gelatine of high quality, it is to be understood that I contemplate its use with glue or other materials that are susceptible to treatment with it to form a coherent film, layer or sheet.

I contemplate as within the scope of my invention all such modifications and mechanical equivalents as fall within the terms of the appended claims.

Having thus described my invention, what I claim as new and desire to secure by Letters Patent is:

1. Apparatus of the character described comprising a movable member having a film receiving surface, a roller in contact with said surface, a squeegee member in contact with said first roller, the space between the roller and the film receiving surface constituting a trough for a film-forming liquid, and means whereby the film receiving surface may be moved past said trough, whereby a film-like layer will be formed thereon the contact between the roller and the surface being such as to prevent the passage of material from the trough.

2. Apparatus of the character described comprising a movable member having a film receiving surface, a rotatable roller with a resilient surface in contact with said first named surface, a squeegee member in contact with said roller, the space between the first named roller and the film receiving surface constituting a trough for a film-forming liquid, means to adjust the roller with respect to the movable member, and means whereby the film receiving surface may be moved past said trough, whereby a film-like layer will be formed thereon the contact between the roller and the surface being such as to prevent the passage of material from the trough.

3. Apparatus of the character described comprising a movable member having a film receiving surface, a rotatable roller with a resilient surface in contact with said first named surface, a squeegee member in contact with said first roller, the space between the first named roller and the member constituting a trough for a film-forming liquid, the roller and squeegee member being mounted on a common support, whereby they may be together moved away from the movable member, and means whereby the film receiving member may be moved past said trough, whereby a film-like layer will be formed thereon, the contact between the roller and the surface being such as to prevent the passage of material from the trough.

4. Apparatus of the character described comprising a movable member having a film receiving surface, a rotatable roller with a resilient surface in contact with said first named surface, a squeegee member in contact with said first roller, the space between the roller and the member constituting a trough for a film-forming liquid, the roller and squeegee member being mounted on a common pivoted support, whereby they may be together swung away from the movable member and means whereby the film receiving member may be moved past said trough, whereby a film-like layer will be formed thereon the contact between the roller and the surface being such as to prevent the passage of material from the trough.

5. Apparatus of the character described comprising a movable drum with a film receiving surface, a rotatable roller with a resilient surface in contact with said first named surface, a second roller with a resilient surface in contact with the first, the two rollers being relatively adjustable, the space between the first roller and the drum constituting a trough for a film-forming liquid and means whereby the drum may be rotated.

6. Apparatus of the character described comprising a movable member having a film receiving surface, a member contacting said surface and forming therewith a trough for a film-forming liquid, and heated dams closing the ends of said trough.

7. Apparatus of the character described comprising a movable member having a film receiving surface, means for controlling the temperature of said surface, a member contacting said surface and forming therewith a trough for a film-forming liquid, and dams closing the ends of said troughs, and means for controlling the temperature of said dams.

8. Apparatus of the character described comprising a movable member having a film receiving surface, means for chilling said surface, a member contacting said surface and forming therewith a trough for a film-forming liquid, and heated dams closing the ends of said troughs.

9. Apparatus of the character described comprising a movable member having a film receiving surface, means for chilling said surface, a member contacting said surface and forming therewith a trough for a film-forming liquid, and dams closing the ends of said trough, said dams being provided with a circulating system, through which a temperature regulating fluid may be circulated.

10. Apparatus of the character described comprising a rotatable drum, means for chilling the surface of said drum, a rotatable roller contacting said drum and forming therewith a trough for a film-forming liquid, and heated dams closing the ends of said trough.

11. Apparatus of the character described comprising a rotatable drum, means for chilling the surface of said drum, a rotatable roller contacting said drum and forming therewith a trough for a film-forming liquid, dams closing the ends of said trough and provided with passages through which a temperature regulating fluid may be circulated, and means for rotating said drum whereby its surface may be moved upwardly past said trough.

12. Apparatus of the character described comprising a movable member with a film receiving surface, a rotatable roller contacting said drum and forming therewith a trough for a film-forming liquid, heated dams closing the ends of said trough, means for squeegeeing the surface of the roller to prevent the removal thereon of liquid from the trough, and means whereby the film receiving surface may be moved upwardly through said trough.

13. Apparatus of the character described comprising a movable member with a film receiving surface, a rotatable roller with a resilient surface contacting said drum and forming therewith a trough for a film-forming liquid, a second rotatable roller contacting said first roller to prevent the removal thereon of liquid from the trough, dams closing the ends of the trough and provided with passages for the circulation of temperature controlling fluid, and means whereby the film receiving surface may be moved upwardly through said trough.

14. Apparatus of the character described comprising a rotatable chill-drum, a rotatable rubber covered roller in contact with the chill-drum a second rubber covered roller in contact with said first roller, the space between the rollers and the surface of the drum constituting a trough for liquid heated gelatine, heated dams closing the ends of the trough so formed, the rollers and drum being so connected that the contacting surface of the drum and the first roller will move upwardly at the same speed, and the contacting surfaces of the two rollers will move in the same direction at the same speed, the rollers being mounted adjustably with respect to each other and with respect to the drum.

Signed at Rochester, New York, this 31st day of March 1921.

JOHN G. JONES.